United States Patent
Herron et al.

(10) Patent No.: US 6,527,274 B2
(45) Date of Patent: Mar. 4, 2003

(54) TURBINE ROTOR-STATOR LEAF SEAL AND RELATED METHOD

(75) Inventors: William Lee Herron, Cincinnati, OH (US); Jeffrey John Butkiewicz, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 09/736,118

(22) Filed: Dec. 13, 2000

(65) Prior Publication Data

US 2002/0109304 A1 Aug. 15, 2002

(51) Int. Cl.$^7$ ................................. F16J 15/44
(52) U.S. Cl. .................. 277/301; 277/411; 277/545; 277/555
(58) Field of Search ................. 277/355, 301, 277/303, 416, 550, 555, 411, 545

(56) References Cited

U.S. PATENT DOCUMENTS

| | | | |
|---|---|---|---|
| 4,325,411 A | * | 4/1982 | Squirrell |
| 4,383,693 A | * | 5/1983 | Heller |
| 4,513,975 A | | 4/1985 | Hauser et al. |
| 4,811,961 A | * | 3/1989 | Williams |
| 4,823,836 A | * | 4/1989 | Bachmann et al. |
| 4,961,588 A | * | 10/1990 | Brienza |
| 5,099,886 A | * | 3/1992 | Squirrell |
| 5,100,158 A | * | 3/1992 | Gardner |
| 5,143,383 A | | 9/1992 | Glynn et al. |
| 5,462,290 A | * | 10/1995 | Alday |
| 5,524,846 A | * | 6/1996 | Shine et al. |
| 5,542,684 A | * | 8/1996 | Squirrell |
| 5,632,493 A | * | 5/1997 | Gardner ............... 277/411 |
| 5,797,723 A | | 8/1998 | Frost et al. |
| 6,032,959 A | * | 3/2000 | Carter ................. 277/355 |
| 6,042,334 A | | 3/2000 | Schilling |
| 6,164,656 A | | 12/2000 | Frost |

FOREIGN PATENT DOCUMENTS

JP    4-342860    * 11/1992

OTHER PUBLICATIONS

"39$^{th}$ GE Turbine State–of–the–Art Technology Seminar", Tab 1, ""F" Technology—the First Half–Million Operating Hours", H.E. Miller, Aug. 1996.
"39th GE Turbine State–of–the–Art Technology Seminar", Tab 2, "GE Heavy–Duty Gas Turbine Perfomrance Characteristics", F. J. Brooks, Aug. 1996.
"39th GE Turbine State–of–the–Art Technology Seminar", Tab 3, "9EC 50Hz 170–MW Class Gas Turbine", A. S. Arrao, Aug. 1996.
"39th GE Turbine State–of–the–Art Technology Seminar", Tab 4, "MWS6001FA—An Advanced–Technology 70–MW Class 50/60 Hz Gas Turbine", Ramachandran et al., Aug. 1996.
"39th GE Turbine State–of–the–Art Technology Seminar", Tab 5, "Turbomachinery Technology Advances at Nuovo Pignone", Benvenuti et al., Aug. 1996.
"39th GE Turbine State–of–the–Art Technology Seminar", Tab 6, "GE Aeroderivative Gas Turbines—Design and Operating Features", M.W. Horner, Aug. 1996.

(List continued on next page.)

*Primary Examiner*—Lynne H. Browne
*Assistant Examiner*—Alison K. Pickard
(74) *Attorney, Agent, or Firm*—Nixon & Vanderhye P.C.

(57) ABSTRACT

A seal assembly for installation between rotating and stationary components of a machine includes a first plurality of leaf spring segments secured to the stationary component in a circumferential array surrounding the rotating component, the leaf spring segments each having a radial mounting portion and a substantially axial sealing portion, the plurality of leaf spring segments shingled in a circumferential direction.

16 Claims, 1 Drawing Sheet

OTHER PUBLICATIONS

"39th GE Turbine State–of–the–Art Technology Seminar", Tab 7, "Advance Gas Turbine Materials and Coatings", P.W. Schilke, Aug. 1996.

"39th GE Turbine State–of–the–Art Technology Seminar", Tab 8, "Dry Low $NO_x$ Combustion Systems for GE Heavy–Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines," J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experence", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program—Conceptual Design and Product Development", Annual Report, Sep. 1, 1994–Aug. 31, 1995.

"Advanced Turbine Systems (ATS), Program Conceptual Design and Product Development", Final Technical Progress Report, vol. 2—Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program Phase 2; Conceptual Design and Product Development",Yearly Technical Progress Report, Reporting Period: Aug. 25, 1993–Aug. 31, 1994.

"Advanced Turbine Systems" Annual Program Review, Preprints, Nov. 2–4, 1998, Washington, D.C., U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First or Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The Art Products", Press Information, Press Release 95–NR10, May 16, 1995, GE Technology Transfer/pp. 1–3.

"General Electric ATS Program Technical Review, Phase 2 Activities", T. Chance et al., pp; 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century—"H" Gas Turbine Combined Cycles", Thomas C. Paul et al., Report,.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, p. 3–13, Oct., 1995.

"Proceedings of the Advanced Turbine Systems Annual Program Review Meeting", vol. I, "H Gas Turbine Combined Cycle", J. Corman, p. 14–21, Oct., 1995.

"Proceedings of the Advanced Turbine Systems Annual Program Review Meeting", vol. I, "Overview of Westinghouse's Advanced Turbine Systems Program", Bannister et al., p. 22–30, Oct., 1995.

"Proceedings of the Advanced Turbine Systems Annual Program Review Meeting", vol. I, "Allison Engine ATS Program Technical Review", D. Mukavetz, p. 31–42, Oct., 1995.

"Proceedings of the Advanced Turbine Systems Annual Program Review Meeting", vol. I, "Advanced Turbine Systems Program Industrial System Concept Development", S. Gates, p. 43–63, Oct., 1995.

"Proceedings of the Advanced Turbine Systems Annual Program Review Meeting", vol. I, "Advanced Turbine System Program Phase 2 Cycle Selection", Latcovich, Jr., p. 64–69, Oct., 1995.

"Proceedings of the Advanced Turbine Systems Annual Program Review Meeting", vol. I, "General Electric ATS Program Technical Review Phase 2 Activities", Chance et al., p. 70–74, Oct., 1995.

"Proceedings of the Advanced Turbine Systems Annual Program Review Meeting", vol. I, "Technical Review of Westinghouse's Advanced Turbine Systems Program", Diakunchak et al., p. 75–86, Oct., 1995.

"Proceedings of the Advanced Turbine Systems Annual Program Review Meeting", vol. I, "Advanced Combustion Turbines and Cycles: An EPRI Perspective", Touchton et al., p. 87–88, Oct., 1995.

"Proceedings of the Advanced Turbine Systems Annual Program Review Meeting", vol. I, "Advanced Turbine Systems Annual Program Review", William E. Koop, p. 89–92, Oct., 1995.

"Proceedings of the Advanced Turbine Systems Annual Program Review Meeting", vol. I, "The AGTSR Consortium: An Update", Fant et al., p. 93–102, Oct., 1995.

"Proceedings of the Advanced Turbine Systems Annual Program Review Meeting", vol. I, "Overview of Allison/AGTSR Interactions", Sy A. Ali, p. 103–106, Oct., 1995.

"Proceedings of the Advanced Turbine Systems Annual Program Review Meeting", vol. I, "Design Factors for Stable Lean Premix Combustion", Richards et al., p. 107–113, Oct., 1995.

"Proceedings of the Advanced Turbine Systems Annual Program Review Meeting", vol. I, "Ceramic Stationary as Turbine", M. van Roode, p. 114–147, Oct., 1995.

"Proceedings of the Advanced Turbine Systems Annual Program Review Meeting", vol. I, "DOE/Allison Ceramic Vane Effort", Wenglarz et al., p. 148–151, Oct., 1995.

"Proceedings of the Advanced Turbine Systems Annual Program Review Meeting", vol. I, "Materials/Manufacturing Element of the Advanced Turbine Systems Program", Karnitz et al., p. 152–160, Oct., 1995.

"Proceedings of the Advanced Turbine Systems Annual Program Review Meeting", vol. I, "Land–Based Turbine Casting Initiative", Mueller et al., p. 161–170, Oct., 1995.

"Proceedings of the Advanced Turbine Systems Annual Program Review Meeting", vol. I, "Turbine Airfoil Manufacturing Technology", Kortovich, p. 171–181, Oct., 1995.

"Proceedings of the Advanced Turbine Systems Annual Program Review Meeting", vol. I, "Pratt & Whitney Thermal Barrier Coatings", Bornstein et al., p. 182–193, Oct., 1995.

"Proceedings of the Advanced Turbine Systems Annual Program Review Meeting", vol. I, "Westinghouse Thermal Barrier Coatings", Goedjen et al., p. 194–199, Oct., 1995.

"Proceedings of the Advanced Turbine Systems Annual Program Review Meeting", vol. I, "High Performance Steam Development", Duffy et al., p. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., p. 221–232, Oct., 1995.

"Proceedings of the Advanced Turbine Systems Annual Program Review Meeting", vol. II, "Rayleigh/Raman/LIF Measurements in a Turbulent Lean Premixed Combustor", Nandula et al. p. 233–248, Oct., 1995.

"Proceedings of the Advanced Turbine Systems Annual Program Review Meeting", vol. II, "Lean Premixed Flames for Low $No_x$ Combustors", Soka et al., p. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., p. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., p. 281–309, Oct., 1995.

"Proceedings of the Advanced Turbine Systems Annual Program Review Meeting", vol. II, "Life Prediction of Advanced Materials for Gas Turbine Application", Zamrik et al., p. 310–327, Oct., 1995.

"Proceedings of the Advanced Turbine Systems Annual Program Review Meeting", vol. II, "Advanced Combustion Technologies for Gas Turbine Power Plants", Vandsburger et al., p. 328–352, Oct., 1995.

"Proceedings of the Advanced Turbine Systems Annual Program Review Meeting", vol. II, "Combustion Modeling in Advanced Gas Turbine Systems", Smoot et al., p. 353–370, Oct., 1995.

"Proceedings of the Advanced Turbine Systems Annual Program Review Meeting", vol. II, "Heat Transfer in a Two-Pass Internally Ribbed Turbine Blade Coolant Channel with Cylindrical Vortex Generators", Hibbs et al. p. 371–390, Oct., 1995.

"Proceedings of the Advanced Turbine Systems Annual Program Review Meeting", vol. II, "Rotational Effects on Turbine Blade Cooling", Govatzidakia et al., p. 391–392, Oct., 1995.

"Proceedings of the Advanced Turbine Systems Annual Program Review Meeting", vol. II, "Manifold Methods for Methane Combustion", Yang et al., p. 393–409, Oct., 1995.

"Proceedings of the Advanced Turbine Systems Annual Program Review Meeting", vol. II, "Advanced Multistage Turbine Blade Aerodynamics, Performance, Cooling, Heat Transfer", Fleeter et al., p. 410–414, Oct., 1995.

"Proceedings of the Advanced Turbine Systems Annual Program Review Meeting", vol. II, The Role of Reactant Unmixedness, Strain Rate, and Length Scale on Premixed Combustor Performance, Samuelson et al., p. 415–422, Oct., 1995.

"Proceedings of the Advanced Turbine Systems Annual Program Review Meeting", vol. II, "Experimental and Computational Studies of Film Cooling With Compound Angle Injection", Goldstein et al., p. 423–451, Oct., 1995.

"Proceedings of the Advanced Turbine Systems Annual Program Review Meeting", vol. II, "Compatibility of Gas Turbine Materials with Steam Cooling", Desai et al., p. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, p. 465–473, Oct., 1995.

"Proceedings of the Advanced Turbine Systems Annual Program Review Meeting", vol. II, Effects of Geometry on Slot–Jet Film Cooling Performance, Hyams et al., p. 474–496 Oct., 1995.

"Proceedings of the Advanced Turbine Systems Annual Program Review Meeting", vol. II, "Steam as Turbine Blade Coolant: Experimental Data Generation", Wilmsen et al., p. 497–505, Oct., 1995.

"Proceedings of the Advanced Turbine Systems Annual Program Review Meeting", vol. II, "Combustion Chemical Vapor Deposited Coatings for Thermal Coating Systems", Hampikian et al., p. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., p. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., p. 529–538, Oct., 1995.

"Proceedings of the Advanced Turbine Systems Annual Program Review Meeting", vol. II, "Bond Strength and Stress Measurements in Thermal Barrier Coatings", Gell et al., p. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., p. 550–551, Oct., 1995.

"Proceedings of the Advanced Turbine Systems Annual Program Review Meeting", vol. II, "Combustion Instability Modeling and Analysis", Santoro et al., p. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., p. 560–565, Oct., 1995.

"Proceedings of the Advanced Turbine Systems Annual Program Review Meeting", vol. II, "Heat Pipe Turbine Vane Cooling", Langston et al., p. 566–572, Oct., 1995.

"Proceedings of the Advanced Turbine Systems Annual Program Review Meeting", vol. II, "Improved Modeling Techniques for Turbomachinery Flow Fields", Lakshminarayana et al., p. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of The Future", Denise Swink, p. 1, Nov., 1996.

"Proceedings of the Advanced Turbine Systems Annual Program Review Meeting", "Gas Turbine Association Agenda", William H. Day, p. 3–16, Nov., 1996.

"Proceedings of the Advanced Turbine Systems Annual Program Review Meeting", "Power Needs in the Chemical Industry", Keith Davidson, p. 17–26, Nov., 1996.

"Proceedings of the Advanced Turbine Systems Annual Program Review Meeting", "Advanced Turbine Systems Program Overview", David Esbeck, p. 27–34, Nov., 1996.

"Proceedings of the Advanced Turbine Systems Annual Program Review Meeting", "Westinghouse's Advanced Turbine Systems Program", Gerard McQuiggan, p. 35–48, Nov., 1996.

"Proceedings of the Advanced Turbine Systems Annual Program Review Meeting", "Overview of GE's H Gas Turbine Combined Cycle", Cook et al., p. 49–72, Nov., 1996.

"Proceedings of the Advanced Turbine Systems Annual Program Review Meeting", "Allison Advanced Simple Cycle Gas Turbine System", William D. Weisbrod, p. 73–94, Nov., 1996.

"Proceedings of the Advanced Turbine Systems Annual Program Review Meeting", "The AGTSR Industry–University Consortium", Lawrence P., Golan, p. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, p. 111–122, Nov., 1996.

"Proceedings of the Advanced Turbine Systems Annual Program Review Meeting", "Methodologies for Active Mixing and Combustion Control", Uri Vandsburger, p. 123–156, Nov., 1996.

"Proceedings of the Advanced Turbine Systems Annual Program Review Meeting", "Combustion Modeling in Advanced Gas Turbine Systems", Paul O. Hedman, p. 157–180, Nov., 1996.

"Proceedings of the Advanced Turbine Systems Annual Program Review Meeting", "Manifold Methods for Methane Combustion", Stephen B. Pope, p. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, p. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, p. 211–232, Nov., 1996.

"Proceedings of the Advanced Turbine Systems Annual Program Review Meeting", "Combustion Instability Studies Application to Land–Based Gas Turbine Combustors", Robert J. Santoro, p. 233–252.

"Proceedings of the Advanced Turbine Systems Annual Program Review Meeting", "Active Control of Combustion Instabilites in Low $NO_x$ Turbines", Ben T. Zinn, p. 253–264, Nov., 1996.

"Proceedings of the Advanced Turbine Systems Annual Program Review Meeting", "Life Prediction of Advanced Materials for Gas Turbine Application," Sam Y. Zamrik, p. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, p. 275–290, Nov., 1996.

"Proceedings of the Advanced Turbine Systems Annual Program Review Meeting", "Compatibility of Gas Turbine Materials with Steam Cooling", Vimal Desai, p. 291–314, Nov., 1996.

"Proceedings of the Advanced Turbine Systems Annual Program Review Meeting", "Bond Strength and Stress Measurements in Thermal Barrier Coatings", Maurice Gell, p. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, p. 335–356, Nov., 1996.

"Proceedings of the Advanced Turbine Systems Annual Program Review Meeting", "Flow Characteristics of an Intercooler System for Power Generating Gas Turbines", Ajay K. Agrawal, p. 357–370, Nov., 1996.

"Proceedings of the Advanced Turbine Systems Annual Program Review Meeting", "Improved Modeling Techniques for Turbomachinery Flow Fields", B. Lakshiminarayana, p. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, p. 393–406, Nov., 1996.

"Proceedings of the Advanced Turbine Systems Annual Program Review Meeting", "Advanced Turbine Cooling, Heat Transfer, and Aerodynamic Studies", Je–Chin Han, p. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, p. 427–446.

"Proceedings of the Advanced Turbine Systems Annual Program Review Meeting", "Experimental and Computational Studies of Film Cooling with Compound Angle Injection", R. Goldstein, p. 447–460, Nov., 1996.

"Proceedings of the Advanced Turbine Systems Annual Program Review Meeting", "Study of Endwall Film Cooling with a Gap Leakage Using a thermographic Phosphor Fluorecence Imaging System", Mingking K. Chyu, p. 461–470, Nov., 1996.

"Proceedings of the Advanced Turbine Systems Annual Program Review Meeting", "Steam as a Turbine Blade Coolant: External Side Heat Transfer", Abraham Engeda, p. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, p. 483–498, Nov., 1996.

"Proceedings of the Advanced Turbine Systems Annual Program Review Meeting", "Closed–Loop Mist–Steam Cooling for Advanced Turbine Systems", Ting Wang, p. 499–512, Nov., 1996.

"Proceedings of the Advanced Turbine Systems Annual Program Review Meeting", "Heat Pipe Turbine Vane Cooling", Langston et al., p. 513–534, Nov., 1996.

"Proceedings of the Advanced Turbine Systems Annual Program Review Meeting", "EPRI's Combustion Turbine Program: Status and Future Directions", Arthut Cohn, p. 535–552 Nov., 1996.

"Proceedings of the Advanced Turbine Systems Annual Program Review Meeting", "ATS Materials Support", Michael Karntiz, p. 553–576, Nov., 1996.

"Proceedings of the Advanced Turbine Systems Annual Program Review Meeting", "Land Based Turbine Casting Initiative", Boyd A. Mueller, p. 577–592, Nov., 1996.

"Proceedings of the Advanced Turbine Systems Annual Program Review Meeting", "Turbine Airfoil Manufacturing Technology", Charles S. Kortovich, p. 593–622, Nov., 1996.

"Proceedings of the Advanced Turbine Systems Annual Program Review Meeting", "Hot Corrosion Testing of TBS's", Norman Bornstein, p. 623–631, Nov., 1996.

"Proceedings of the Advanced Turbine Systems Annual Program Review Meeting", "Ceramic Stationary Gas Turbine", Mark van Roode, p. 633–658, Nov., 1996.

"Proceedings of the Advanced Turbine Systems Annual Program Review Meeting", "Western European Status of Ceramics for Gas Turbines", Tibor Bornemisza, p. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine—High Efficiency, Low Cost of Electricity and Low Emissions", Roger Schoenwald and Patrick Marolda, (no date available).

"Testing Program Results Validate GE's H Gas Turbine—High Efficiency, Low Cost of Electricity and Low Emissions", Slide Presentation—working draft, (no date available).

"The Next Step In H . . . For Low Cost Per kW–Hour Power Generation", LP–1 PGE '98.

"Utility Advanced Turbine System (ATS) Technology Readiness Testing and Pre–Commercialized Demonstration", Document #486040, Oct.–1–Dec. 31, 1996, Publication Date, Jun. 1, 1997, Report Nos.: DOE/MC/31176——5628,.

"Utility Advanced Turbine System (ATS) Technology Readiness Testing—Phase 3", Document #666274, Oct. 1, 1996–Sep. 30, 1997, Publication Date, Dec. 31, 1997, Reports Nos.: DOE/MC/31176–10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Reports Nos: DOE/MC/31176–5340.

"Utility Advanced Turbine System (ATS) Technology Readiness Testing and Pre–Commercial Demonstration Phase 3", Document #486132, Apr. 1–Jun. 30, 1976, Publication Date, Dec. 31, 1996, Report Nos: DOE/MC/31176–5660.

"Utility Advanced Turbine System (ATS) Technology Readiness Testing and Pre–Commercial Demonstration—Phase 3", Document #587906, Jul. 1–Sep. 30, 1995, Publication Date, Dec. 31, 1995, Report Nos: DOE/MC/31176–5339.

"Utility Advanced Turbine System (ATS) Technology Readiness Testing and Pre–Commercialization Demonstration" Jan. 1–Mar. 31, 1996, DOE/MC/31176—5338.

"Utility Advanced Turbine System (ATS) Technology Readiness Testing Phase 3R", Document #756552, Apr. 1–Jun. 30, 1999, Publication Date, Sep. 1, 1999, Report Nos.: DE——FC21–95MC31176–23.

"Utility Advanced Turbine System (ATS) Technology Readiness Testing.", Document #656823, Jan. 1–Mar. 31, 1997, Publication Date, Aug. 1, 1998, Report Nos.: DOE/MC/31176–17.

"Utility Advanced Turbine System (ATS) Technology Readiness Testing and Pre–Commercial Demonstration", Annual Technical Progress Report, Reporting Period: Jul. 1, 1995–Sep. 30, 1996.

"Utility Advanced Turbine System (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998, Publication Date: May, 1, 1999, Report Nos.: DE–FC21–95MC31176–20.

"Utility Advanced Turbine System (ATS) Technology Readiness Testing", Document #1348, Apr. 1–Jun. 29, 1998, Publication Date Oct. 29, 1998, Report Nos. DE–FC21–95MC31176—18.

"Utility Advanced Turbine System (ATS) Technology Readiness Testing—Phase 3", Annual Technical Progress Report, Reporting Period: Oct. 1, 1996–Sep. 30, 1997.

"Utility Advanced Turbine System (ATS) Technology Readiness Testing and Pre–Commercial Demonstration", Quarterly Report, Jan. 1–Mar. 31, 1997, Document #666275, Report Nos.: DOE/MC/31176–07.

"Proceedings of the 1997 Advanced Turbine Systems", Annual Program Review Meeting, Oct. 28–29, 1997.

* cited by examiner

TURBINE ROTOR-STATOR LEAF SEAL AND RELATED METHOD

This invention relates generally to seals between rotating and stationary machine components and specifically, to a leaf seal assembly between a stator and a turbine rotor. This invention was made with Government support under Contract No. DE-FC21-95MC31176 awarded by the Department of Energy. The Government has certain rights in this invention.

BACKGROUND OF THE INVENTION

Gas turbine operation depends upon the controlled flow of air between rotating and static components. Seals are introduced between these components in order to direct the flow in the desired paths. For example, it may be desirable in some cases to prevent flow in some directions, such as into bearing housings, while in other cases, it may be desirable to direct a controlled amount of flow to actively purge cavities, cool components, and prevent hot flowpath gases from contacting rotor components. Examples of this latter type of seal may be found in the compressor discharge secondary flow circuit and in the paths around the turbine nozzle diaphragms. Establishing a seal that provides a controlled amount of leakage, independent of operating condition, thermal transients, and operating age, has been an ongoing design objective.

A number of different seal designs have been used in the gas turbine industry. These include: "pumpkin teeth" seals; labyrinth seals; honeycomb seals; and brush seals. All of these designs are intended to provide a "tortuous" path for the air and thus minimize the leakage across them. Table I describes the prior seals, qualitatively comparing them based on certain key features:

TABLE I

| FEATURE | PUMP-KIN | LABYRINTH | HONEY-COMB | BRUSH |
| --- | --- | --- | --- | --- |
| rotor stator contact | no | possible | yes | yes |
| deterioration w/ usage | no | if contact | yes | slight |
| adapts to transients, operating points | no | no | no | yes |
| relative leakage flow | high | lower (because of lower clearances) | lower still | very low |
| "windage" temperature rise of leakage air | slight | slight | higher | lower |
| adapts to casing non-symmetry | no | no | no | yes |

Note that in many applications, some minimum level of air leakage is required to ensure cavity purge flow high enough to preclude contact of rotor structural components with hot gaspath gasses. For this reason, holes allowing air to bypass the seal may be included with brush or honeycomb seals. One difficulty with this approach, however, is that to ensure safe operation, the holes must be sized to provide sufficient flow based a new seal configuration. If the seal later deteriorates, and leaks more flow than when new, the total flow past the seal will be greater than design requirements.

BRIEF SUMMARY OF THE INVENTION

The present invention utilizes a circumferential array of leaf seals clamped (or otherwise fixed) into the stator component. In the preferred embodiment, the individual leaf seal components or segments each comprise a primary spring and a backing spring, each attached to the stator. The primary spring has an attachment portion and a seal portion that extends generally axially along the rotor, curving toward and then away from the rotor surface in the flow direction. The backing spring also has an attachment portion and a more sharply curved backing portion that engages substantially tangentially the backside of the primary spring. The backing spring serves two purposes:

1. Because of its different curvature and possibly different thickness, the effective stiffness of the two springs together will be non-linear (i.e.: the load-deflection curve will be a curve, not a straight line). This will allow the seal opening, and thus performance, to be optimized over a greater range of operating conditions.
2. Since the two springs will rub against each other, they will serve as friction dampers for each other, preventing vibration and fatigue that might result from aerodynamic instabilities or flutter of the seal.

The collective array of leaf seal segments are circumferentially overlapped or shingled, requiring the backing springs to be slightly shorter in tangential length than the primary springs. The primary springs are assembled with a slight radial gap relative to the rotor when the machine is not in operation. When the machine is started, a pressure differential develops across the seal, with the higher upstream pressure trying to push the seal open. The force pushing the seal open will be based upon the difference between the total upstream pressure and the total downstream pressure. As soon as fluid flow past the seal begins, however, the force will drop. This is because the air attains a velocity and the force depends upon the difference between the static upstream and downstream pressures. The downstream velocity will be low, so this static pressure will approximate the total pressure, but the upstream static pressure (opening force) will drop by an amount proportional to the flow rate/velocity.

Since the force opening the seal decreases as the flow rate/velocity increases, and the spring force closing the seal increases with the seal opening, the seal can be designed to allow a controlled "leakage" for any given design point.

Accordingly, in one aspect, the invention relates to a seal assembly for installation between rotating and stationary components of a machine comprising a first plurality of leaf spring segments secured to the stationary component in a circumferential array surrounding the rotating component, the leaf spring segments each having a radial mounting portion and a substantially axial sealing portion, the plurality of leaf spring segments being shingled in a circumferential direction.

In another aspect, the invention relates to a turbine rotor and stator arrangement including a leaf spring seal assembly comprising a rotor; a stator surrounding the rotor in radially spaced relation thereto; and a leaf spring seal between the rotor and the stator, the leaf spring seal including a first plurality of leaf spring segments fixed to the stator in a circumferential array about the rotor, the leaf spring segments being circumferentially shingled, and each having a sealing portion defining a predetermined radial gap between the sealing portion and the rotor when the rotor is at rest.

In still another aspect, the invention relates to a method of sealing a radial gap between a rotor and a stator comprising: a) mounting a first plurality of leaf spring segments to the stator; and b) arranging the first plurality of leaf spring segments in a circumferentially shingled array about the rotor.

DETAILED DESCRIPTION OF THE INVENTION

Figure 1:
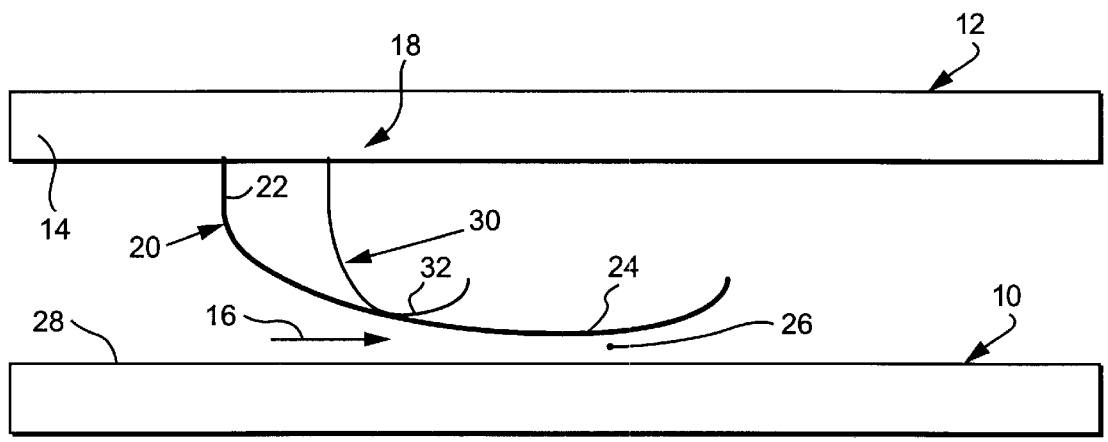
FIG. 1 is a schematic side section of leaf seal components between a stator and rotor in accordance with an exemplary embodiment of the invention.

With reference to FIG. 1, a rotor 10 and stator 12 are illustrated schematically, with a radial gap 14 therebetween. In a gas turbine environment, air flow in the direction indicated by arrow 16 is controlled by a leaf spring seal assembly 18. The seal assembly 18 comprises individual leaf seal components or segments that are arranged circumferentially about the rotor 10 in a "shingled" or overlapped arrangement best seen in FIG. 2. The controlled flow is desired to, for example, actively purge cavities while cooling components and preventing hot flowpath gases from contacting rotor components, e.g., in compressor discharge secondary flow circuits and in paths around the turbine nozzle diaphragms.

Each individual leaf seal component or segment includes a primary leaf spring segment 20 with a mounting portion 22 and a sealing portion 24. The former is attached to the stator 12 by any suitable means (e.g. mechanically clamped or otherwise suitably fixed to the stator), while the sealing portion curves in an axial direction toward then away from the rotor, in a direction of flow, with a minimum radial gap at 26. The primary spring segment 20 is substantially flat in a tangential direction, i.e., as viewed in FIG. 2, noting that each leaf seal segment is oriented generally tangentially with respect to the surface 28 of the rotor. The extent of the leaf seal segment in the tangential direction is referred to herein as its tangential length.

Each leaf seal segment also includes a secondary or backing leaf spring segment 30, also attached to the stator 12 in a similar fashion. The backing spring segment 30 is located behind or downstream of the primary spring with a more sharply curved portion 32 engaging the backside of the primary spring in a generally tangential fashion.

Figure 2:
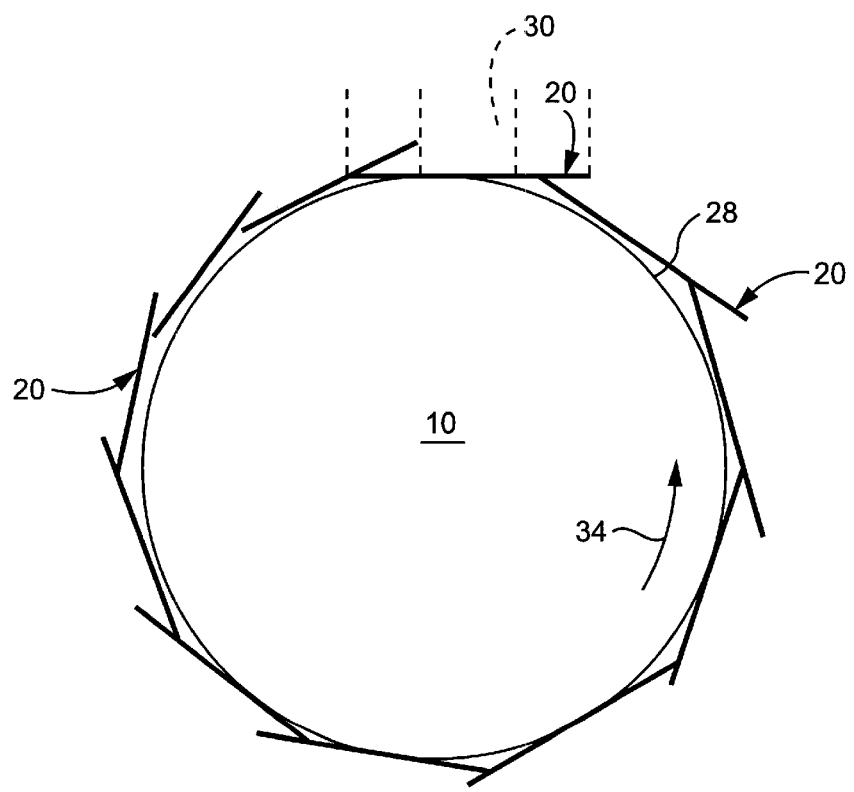
FIG. 2 is a schematic end view illustrating the manner in which the leaf seal components are shingled or overlapped in a circumferential direction.

Referring to FIG. 2, it will be apparent that in order to overlap or shingle the individual leaf seal assemblies without interference, the backing spring segments 30 will have a shorter tangential length than the primary springs. Nevertheless, the backing spring will be centered on the primary spring as shown in phantom in FIG. 2.

Both the primary and secondary spring segments 20, 30 are preferably constructed of spring steel, the specified alloy composition and the thickness of each dependent on the application. The tangential length of the primary springs will depend on the number of segments employed, which is again, application specific. It will be appreciated that the respective effective stiffnesses of spring segments 20, 30 may vary based on different degrees of curvature, different thicknesses and different alloys. This means that the spring stiffness will be non-linear, thus permitting seal opening and thus performance to be optimized over a wide range of operating conditions.

A further advantage to the leaf spring seal consisting of chordal segments shingled over each other is that non-symmetry of the casing can be accommodated, as the different segments may self-adjust to different deflections to maintain a consistent clearance.

Prior to starting the machine, the primary spring segments 20 should be assembled with a slight gap (at 26) from the rotor surface. At this time, P1 (pressure upstream of the seal 18)=P2 (pressure downstream of the seal 18)=P3 (pressure at the radial gap 26). When the machine is started, P1 will increase more than will P2. In the potential application illustrated (the high pressure packing seal of a particular machine) the pressure across the seal 18 will approach 2:1 at full speed/full load, resulting in choked flow across the seal. At low P1/P2, the flow across the seal assembly 18 will be low, and so the flow velocity will be low, as will the opening force. As P1/P2 increases, the Mach number of flow across the seal will also increase, and the ratio of P1/P3 will decrease. While P3 will still be greater than is P2, it will not be as much above it as is P1, so there will be a reduced force opening the seal. This will be countered by the spring force exerted by both the primary spring segments 20 and backing spring segments 30 closing the gap 26. Thus, the flow will be controlled by P1/P2 and the designed opening of the seal at operating conditions. Thus, the seal gap 26 and leakage adapt themselves to the operating conditions. Again, the backing spring segments 30 will preclude any instability as the seal adjusts.

Typically, the rotor 10 and the stator 12 will have different transient responses to changes in the operating conditions of the machine. At startup, the rotor 10 will rotate in the direction of arrow 34, and may grow rapidly towards the stator 12, due to centrifugal loading. Subsequent to that, the stator 12 will typically respond thermally more quickly than will the rotor 10, and grow away from the rotor, which will subsequently make up some of that gap. As the machine is shut down, the process will be reversed. The pressure ratio across the seal assembly 18 will be largely independent of the thermal transient changes, and so the opening force, and the seal gap 26 will adapt to those changes. As the gap 26 follows the opening forces, however, the spring forces will act to counter those force changes, thus minimizing flow variations.

The surfaces of the primary spring segments 20 and backing spring segments 30 are all smooth, so there will be very little windage-induced temperature increase. Since there is no contact between the seal assembly 18 and the surface of the rotor 10, there will be little if any deterioration of the seal.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A seal assembly for installation between rotating and stationary components of a machine comprising:

a first plurality of leaf spring segments secured to the stationary component in a circumferential array surrounding the rotating component, said leaf spring segments each having a radial mounting portion and a substantially axial sealing portion, said plurality of leaf spring segments arranged to be shingled in a circumferential direction, and to maintain a radial gap between said first plurality of leaf spring segments and the rotating component, and further comprising a second plurality of leaf spring segments downstream of said first plurality of leaf spring segments, secured to said stationary component and arranged to engage back surfaces of respective substantially axial sealing portions of said first plurality of leaf spring segments.

2. The seal assembly of claim 1 wherein said first and second plurality of leaf spring segments have different respective curvatures.

3. The seal assembly of claim 1 wherein said first and second plurality of leaf spring segments have different thicknesses.

4. The seal assembly of claim 1 wherein said first and second plurality of leaf spring segments have different respective effective stiffness.

5. The seal assembly of claim 1 wherein said first and second plurality of leaf spring segments are constructed of spring steel.

6. The seal assembly of claim 1 wherein said second plurality of leaf spring segments are curved such that they engage said first plurality of leaf spring segments substantially tangentially.

7. A turbine rotor and stator arrangement including a leaf spring seal assembly comprising:

a rotor;

a stator surrounding said rotor in radially spaced relation thereto; and a leaf spring seal assembly between said rotor and said stator adapted to permit a controlled flow of air past said leaf spring seal assembly and including a first plurality of leaf spring segments fixed to said stator in a circumferential array about said rotor, said leaf spring segments being circumferentially shingled, and each having a sealing portion defining a predetermined radial gap between the sealing portion and the rotor, and further comprising a second plurality of leaf spring segments downstream of said first plurality of leaf spring segments, secured to said stator and arranged to engage respective substantially axial sealing portions of said first plurality of leaf spring segments.

8. The arrangement of claim 7 wherein said first and second plurality of leaf spring segments have different respective curvatures.

9. The arrangement of claim 7 wherein said first and second plurality of leaf spring segments have different thicknesses.

10. The arrangement of claim 7 wherein said first and second plurality of spring segments have different respective effective stiffnesses.

11. The arrangement of claim 7 wherein said first and second plurality of leaf spring segments are constructed of spring steel.

12. The arrangement of claim 7 wherein said second plurality of leaf spring segments are curved such that they engage said first plurality of leaf spring segments substantially tangentially.

13. The arrangement of claim 7 wherein said second plurality of leaf spring segments engage back sides of said first plurality of leaf springs.

14. A method of sealing a radial gap between a rotor and a stator in a turbine so as to allow controlled leakage of air through the radial gap comprising:

a.) mounting a first plurality of leaf spring segments to said stator; and b.) arranging said first plurality of leaf spring segments in a circumferentially shingled array about said rotor such that a radial gap is maintained between said rotor and said first plurality of leaf spring segments; and c.) mounting a second plurality of leaf spring segments behind respective ones of said first plurality of leaf spring segments, with said second plurality of leaf spring segments engaging said first plurality of leaf spring segments.

15. The method of claim 14 wherein said first plurality of leaf spring segments each have a sealing face and a backside, and wherein said second plurality of leaf spring segments engage the backside of said first plurality of leaf spring segments.

16. The method of claim 15, wherein composition, thickness, length and stiffness of said first and second pluralities of spring segments are chosen so that said radial gap is controlled through a range of operating conditions of the turbine.

* * * * *

UNITED STATES PATENT AND TRADEMARK OFFICE
CERTIFICATE OF CORRECTION

PATENT NO. : 6,527,274 B2  Page 1 of 1
DATED : March 17, 2003
INVENTOR(S) : Herron et al.

It is certified that error appears in the above-identified patent and that said Letters Patent is hereby corrected as shown below:

Column 6,
Line 32, change "15" to -- 14 --.

Signed and Sealed this

Third Day of June, 2003

JAMES E. ROGAN
*Director of the United States Patent and Trademark Office*